(12) United States Patent
Veras et al.

(10) Patent No.: US 10,670,779 B1
(45) Date of Patent: Jun. 2, 2020

(54) MULTI-LAYERED OPTICAL ELEMENT

(71) Applicant: Lockheed Martin Corporation, Bethesda, MD (US)

(72) Inventors: Johann M. Veras, Orlando, FL (US); David R. Twede, Orlando, FL (US); Clara R. Baleine, Orlando, FL (US); Gary C. Vanstone, Merritt Island, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 333 days.

(21) Appl. No.: 15/699,679

(22) Filed: Sep. 8, 2017

Related U.S. Application Data (60) Provisional application No. 62/385,028, filed on Sep. 8, 2016.

(51) Int. Cl.
| | |
|---|---|
| *G02B 3/00* | (2006.01) |
| *G02B 5/20* | (2006.01) |
| *G02B 27/28* | (2006.01) |
| *G02B 5/30* | (2006.01) |

(52) U.S. Cl.
CPC ......... *G02B 3/0056* (2013.01); *G02B 3/0087* (2013.01); *G02B 5/201* (2013.01); *G02B 5/3083* (2013.01); *G02B 27/286* (2013.01); *G02B 2003/0093* (2013.01)

(58) Field of Classification Search
CPC .... G02B 3/0056; G02B 3/0087; G02B 5/201; G02B 5/3083; G02B 27/286; G02B 2003/0093
See application file for complete search history.

(56) References Cited

U.S. PATENT DOCUMENTS

| | | | |
|---|---|---|---|
| 8,411,146 B2 | 4/2013 | Twede | |
| 8,462,238 B2 | 6/2013 | Fredembach et al. | |
| 9,110,292 B1 | 8/2015 | Twede et al. | |
| 9,340,446 B1 | 5/2016 | Baleine et al. | |
| 9,426,401 B2 | 8/2016 | Twede et al. | |
| 10,310,146 B2 * | 6/2019 | Williams | G02B 3/0087 |
| 2002/0024653 A1 | 2/2002 | Jung et al. | |
| 2006/0238714 A1 | 10/2006 | Fox et al. | |
| 2008/0165263 A1 | 7/2008 | Hsu | |
| 2009/0129723 A1 | 5/2009 | Chen et al. | |

(Continued)

OTHER PUBLICATIONS

Gupta, S., "Single-order transmission diffraction gratings based on dispersion engineered all-dielectric metasurfaces," Journal of the Optical Society of America A, vol. 33, No. 8, Aug. 2016, 7 pages.

(Continued)

*Primary Examiner* — Wen Huang
(74) *Attorney, Agent, or Firm* — Withrow & Terranova, PLLC (57) ABSTRACT

An optical element is disclosed. The optical element includes a plurality of layers. The plurality of layers includes a notch filter array that has a plurality of notch filter elements. Each notch filter element is configured to filter out energy within at least one wavelength band of interest. The plurality of layers further includes a polarization-responsive grid array having a plurality of polarization elements and includes a microlens array having a plurality of microlens elements. Each microlens element is configured to image a portion of a scene onto an image plane.

18 Claims, 4 Drawing Sheets

(56) References Cited

U.S. PATENT DOCUMENTS

| | | | |
|---|---|---|---|
| 2011/0249157 A1 | 10/2011 | Fredembach et al. | |
| 2014/0015932 A1 | 1/2014 | Kim et al. | |
| 2014/0268146 A1* | 9/2014 | Hinnrichs | G01J 3/18 |
| | | | 356/364 |
| 2014/0307309 A1 | 10/2014 | Downing et al. | |
| 2015/0138366 A1 | 5/2015 | Keelan et al. | |
| 2015/0234102 A1 | 8/2015 | Kurzweg et al. | |
| 2015/0256801 A1 | 9/2015 | Yamanaka et al. | |
| 2015/0265195 A1 | 9/2015 | Darty et al. | |
| 2015/0316473 A1* | 11/2015 | Kester | G06K 9/22 |
| | | | 250/339.02 |
| 2015/0334357 A1 | 11/2015 | Wang et al. | |
| 2016/0088242 A1 | 3/2016 | Baleine et al. | |
| 2017/0034456 A1 | 2/2017 | Kyung et al. | |
| 2017/0123121 A1 | 5/2017 | Downing et al. | |

OTHER PUBLICATIONS

Jahani, S., et al., "All-dielectric metamaterials," Nature Nanotechnology, vol. 11, Jan. 7, 2016, 14 pages.

Jiang, Z.H., et al., "Tailoring Dispersion for Broadband Low-loss Optical Metamaterials Using Deep-subwavelength Inclusions," Nature Scientific Reports, vol. 3, No. 1571, Mar. 28, 2013, 9 pages.

Khorasaninejad, M., et al., "Macro to nanoscale imaging using planar lenses at visible wavelengths," SPIE Newsroom, doi: 10.1117/2.1201608.006633, Sep. 6, 2016, 4 pages.

Khorasaninejad, M., et al., "Multispectral Chiral Imaging with a Metalens," Nano Letters, vol. 16, Jun. 7, 2016, 13 pages.

Kildishev, A.V., et al., "Planar Photonics with Metasurfaces," Science, vol. 339, Mar. 15, 2013, 7 pages.

Lepicard, A., "Design of surface chemical reactivity and optical properties in glasses," Doctoral Dissertation, University of Central Florida, Electronic Theses and Dissertations, 5264, Fall Term 2016, 288 pages.

Lepicard, A., et al., "Micro-structuring the surface reactivity of a borosilicate glass via thermal poling," Chemical Physics Letters, vol. 664, Sep. 30, 2016, 6 pages.

Li, L., et al., "Integrated flexible chalcogenide glass photonic devices," Nature Photonics, vol. 8, Jun. 29, 2014, 7 pages.

Nye, N.S., et al., "Passive PT-Symmetric Metasurfaces With Directional Field Scattering Characteristics," IEEE Journal of Selected Topics in Quantum Electronics, vol. 22, No. 5, Sep. 2016, 8 pages.

Rahmlow, Jr., T.D., et al., "Narrow Band Infrared Filters with Broad Field of View," Proceedings of SPIE, vol. 6206, Infrared Technology and Applications XXXII, 62062S, May 18, 2006, Orlando, Florida, USA, 9 pages.

Shen, B., et al, "Ultra-high-efficiency metamaterial polarizer," Optica, vol. 1, No. 5, Nov. 20, 2014, 5 pages.

Twede, D., et al., "A concept for hyperspectral imaging with compressive sampling and dictionary recovery," Proceedings of SPIE, vol. 9472, Algorithms and Technologies for Multispectral, Hyperspectral, and Ultraspectral Imagery XXI, 94720A, May 2015, Baltimore, Maryland, USA, 7 pages.

Veras, J., et al., "Local imaging from global measurements applied to selective-spectral imaging," Proceedings of SPIE, vol. 9088, Algorithms and Technologies for Multispectral, Hyperspectral, and Ultraspectral Imagery XX, 30881B, Jun. 13, 2014, Baltimore, Maryland, USA, 9 pages.

Werner, D., et al., "Adaptive phase change metamaterials for infrared aperture control," Proceedings of SPIE, vol. 8165, Unconventional Imaging, Wavefront Sensing, and Adaptive Coded Aperture Imaging and Non-Imaging Sensor Systems, 81651H, Sep. 8, 2011, San Diego, California, USA, 10 pages.

Yu, N., et al., "Flat optics with designer metasurfaces," Nature Materials, vol. 13, Jan. 23, 2014, 12 pages.

Non-Final Office Action for U.S. Appl. No. 15/380,317, dated Jun. 30, 2017, 17 pages.

Final Office Action for U.S. Appl. No. 15/380,317, dated Jan. 16, 2018, 16 pages.

Advisory Action for U.S. Appl. No. 15/380,317, dated Apr. 12, 2018, 3 pages.

Non-Final Office Action for U.S. Appl. No. 15/380,484, dated Jul. 14, 2017, 18 pages.

Final Office Action for U.S. Appl. No. 15/380,484, dated Jan. 29, 2018, 16 pages.

Notice of Allowance for U.S. Appl. No. 15/380,317, dated May 10, 2018, 7 pages.

Advisory Action for U.S. Appl. No. 15/380,484, dated Apr. 20, 2018, 3 pages.

Notice of Allowance for U.S. Appl. No. 15/380,484, dated Jul. 20, 2018, 8 pages.

* cited by examiner

MULTI-LAYERED OPTICAL ELEMENT

RELATED APPLICATION

This application claims the benefit of U.S. Provisional Application No. 62/385,028, filed on Sep. 8, 2016, entitled MULTI-LAYERED OPTICAL ELEMENT, the disclosure of which is hereby incorporated herein by reference in its entirety.

TECHNICAL FIELD

The embodiments relate to a multi-layered optical element that facilitates multimodal sensing of a scene.

BACKGROUND

In certain applications, it may be desirable to capture different types of information transmitted or reflected from a scene. A conventional camera, for example, captures visible light information transmitted or reflected from a scene. For certain applications, it may be desirable to capture other types of information, for example polarization information from a scene, along with wavelength information. It may also be desirable to capture different types of information from different portions of the scene.

SUMMARY

Disclosed herein is a very thin, planar, and monolithically integrated multi-layered optical element that provides simultaneous modalities, such as, by way of non-limiting example, multi-spectral, polarimetric, and phase, with imaging data collection at the single pixel/single frame level. The multi-layered optical element is a monolithic optical element placed in front of a sensor imaging plane. The multi-layered optical element may be located, for example, at a non-image plane, such as at an aperture stop or a pupil plane.

In one embodiment, an optical element comprising a plurality of layers is disclosed. The plurality of layers includes a notch filter array that has a plurality of notch filter elements. Each notch filter element is configured to filter out energy within at least one wavelength band of interest. The plurality of layers further includes a polarization-responsive grid array having a plurality of polarization elements and includes a microlens array having a plurality of microlens elements. Each microlens element is configured to image a portion of a scene onto an image plane.

As used herein, the phrase "notch filter" is a filter that receives a wavelength spectrum and filters out (i.e., "notches") one or more non-contiguous wavelength bands (sometimes referred to herein as a wavelength band of interest) within the wavelength spectrum, to form filtered energy that is within the wavelength spectrum but that does not contain energy within the non-contiguous wavelength bands that have been "notched out." The wavelength band, or bands, that are notched out may be, for example, 10% or less of the range of the wavelength spectrum of interest. For example, for a wavelength spectrum of interest between 700 nm and 1400 nm, the wavelength band that is notched out may be 70 nm, such as those wavelengths between 900 nm and 970 nm. In some embodiments, the size of the notched out wavebands may be less than 10% or more than 10% of the wavelength spectrum of interest.

In another embodiment, an optical system is disclosed. The optical system includes an objective lens system configured to receive energy from a scene and focus the energy on an intermediate image plane. The optical system also includes a detector array. The optical system further includes an optical element positioned at a non-image plane downstream of the intermediate image plane and upstream of the detector array. The optical element includes a plurality of layers. The plurality of layers includes a notch filter array that has a plurality of notch filter elements. Each notch filter element is configured to filter out energy within at least one wavelength band of interest. The plurality of layers further includes a polarization-responsive grid array having a plurality of polarization elements and includes a microlens array having a plurality of microlens elements. Each microlens element is configured to image a portion of a scene onto an image plane.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first layer" and "second layer," and does not imply a priority, a type, an importance, or other attribute, unless otherwise stated herein.

As used herein and in the claims, the articles "a" and "an" in reference to an element refers to "one or more" of the element unless otherwise explicitly specified.

Disclosed herein is a very thin, planar, and monolithically integrated multi-layered optical element that provides simultaneous modalities, such as, by way of non-limiting example, multi-spectral, polarimetric, and phase, with imaging data collection at the single pixel/single frame level. The multi-layered optical element is a monolithic optical element placed in front of a sensor imaging plane. The multi-layered optical element may be located, for example, at a non-image plane, such as at an aperture stop or a pupil plane.

Figure 1:
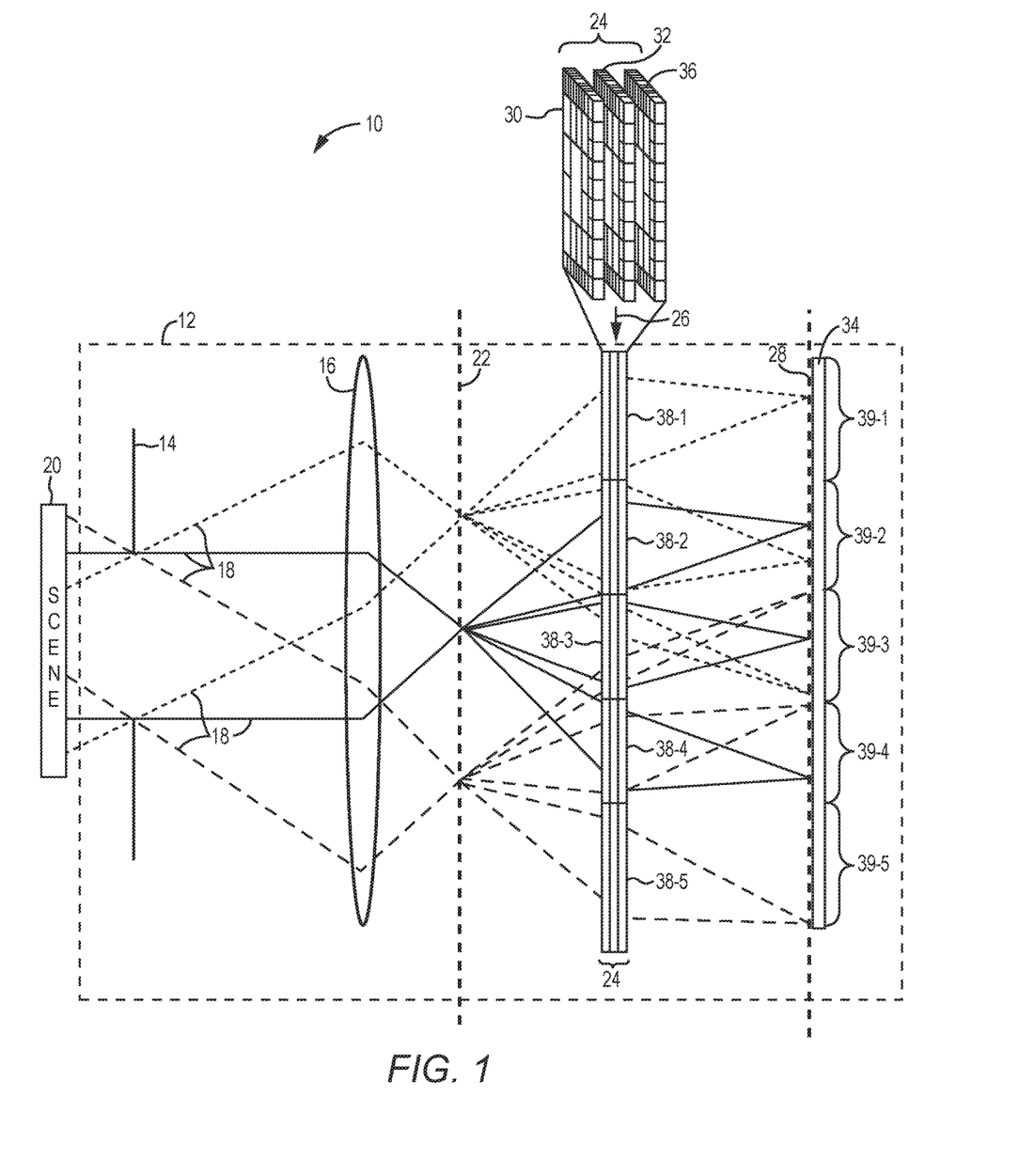
FIG. 1 is a diagram illustrating a system in which embodiments disclosed herein may be practiced.

FIG. 1 is a diagram illustrating an environment 10 in which embodiments disclosed herein may be practiced. The environment 10 includes an optical device 12. The optical device 12 includes an aperture stop 14, and an objective lens 16. Energy, in the form of electromagnetic radiation (EMR) 18, from a scene 20 is focused onto an intermediate image plane 22. The scene 20 may be located, optically, at infinity. A multi-layered optical element 24 according to one embodiment is positioned at a non-image plane location 26 between the intermediate image plane 22 and a sensor image plane 28. The non-image plane location 26 may comprise, for example, a pupil plane and/or an aperture stop, but note that unlike an image plane, the non-image plane location 26 is a plane wherein the EMR 18 from the scene 20 is not focused.

In this embodiment, the multi-layered optical element 24 includes a first layer that comprises a notch filter array 30 comprising a plurality of notch filter elements. Each notch filter element is configured to filter out a portion of energy, in this example a portion of the EMR 18, within a wavelength band of interest. The multi-layered optical element 24 also includes a second layer that comprises a microlens array 32 comprising a plurality of microlens elements. Each microlens element is configured to image a portion of the scene 20 onto the image plane 22. In some embodiments, each microlens element is both an objective and an imager. In such embodiments, there may be no objective lens 16 or intermediate image plane 22. In other embodiments, such as the embodiment illustrated in FIG. 1, each microlens element relays a sub-image from the intermediate image plane 22 that is upstream from the microlens element onto the sensor image plane 28 that is downstream from the microlens element.

A detector array 34, such as a focal plane array (FPA) detector array, a charge-coupled device (CCD) detector array, or a complimentary metal-oxide semiconductor (CMOS) detector array, is positioned at the sensor image plane 28. The detector array 34 comprises a grid of detector elements at a desired resolution, such as, by way of non-limiting example, a grid of 1024×1024 detector elements.

The multi-layered optical element 24 also includes a third layer that comprises a polarization-responsive grid array 36 comprising a plurality of polarization elements. In one embodiment, the polarization elements pass energy based on polarization orientation, such as circularly or linearly polarized EMR 18 that has a particular orientation. For example, each polarization element may pass only EMR 18 that has a particular polarization state, such as a polarization state of the EMR 18 oriented at 0 degrees, or 45 degrees, or 90 degrees, or only the EMR 18 that is right-hand circularly polarized or left-hand circularly polarized. In another embodiment, the polarization elements are based on birefringence. The polarization elements comprise birefringent anisotropic elements, each birefringent anisotropic element configured to displace the S and P polarization of the EMR 18, from ordinary and extraordinary axes, at different angles or rotations of displacement.

Each layer of the three layers of the optical element 24 is in contact with the adjacent layer. While in this embodiment the notch filter array 30 is upstream of the microlens array 32, and the polarization-responsive grid array 36 is downstream of the microlens array 32, the embodiments are not limited to any particular order of the layers, and different embodiments may have the layers in different orders depending on a desired design of the system.

While not illustrated in FIG. 1, other layers that may be part of the optical element 24 include a phase microgrid array comprising a plurality of phase filters that modify the phase of the EMR 18, and an intensity micromask array comprising a plurality of intensity filters that modify the intensity of the EMR 18. The optical element 24 can comprise any combination of the microlens array 32, the notch filter array 30, the polarization-responsive grid array 36, a phase microgrid array, and the intensity micromask array.

The microlens array 32 comprises a plurality of different microlens elements, each of which is configured to relay a sub-image of the scene 20 from the intermediate image plane 22 that is upstream from the microlens element onto the sensor image plane 28 that is downstream from the microlens element. For example, microlens elements 38-1-38-5 (generally, microlens elements 38) relay corresponding sub-images 39-1-39-5 (generally, sub-images 39) of the scene 20 to the sensor image plane 28. Each of the sub-images 39 is captured by a set of detector elements of the detector array 34. Thus, each microlens element 38-1-38-5 is mapped to and corresponds to a particular set of the detector elements of the detector array 34. In some embodiments, the sub-images 39 are designed to overlap one another such that EMR 18 from multiple different microlens elements 38 is received by the same detector elements of the detector array 34. In other embodiments, a single portion of the scene 20 is imaged by multiple microlens elements 38 onto separate portions of the detector array 34 as separate sub-images 39. For example, in FIG. 1, the EMR 18 depicted by the solid rays (as opposed to dashed) is imaged by the microlens elements 38-2, 38-3 and 38-4 as sub-images 39-2, 39-3 and 39-4, respectively. This facilitates multiple modalities of the same portion of the scene 20 due to the different polarization elements and notch filter elements that correspond to (i.e., are associated with) the different microlens elements 38-2, 38-3 and 38-4.

In some embodiments, the microlens array 32 alone can serve as the system objective of an optical system. For more flexibility, in other embodiments, such as that illustrated in FIG. 1, the main objective lens 16 and the planar microlens array 32 together form a system objective lens assembly, and relay an image of the scene 20 into sub-images 39 at the image plane 28, each sub-image 39 being relayed to a different position on the detector array 34, and each sub-image 39 with a different subset of field angles due to the aperture stop associated with the particular microlens element 38.

Due to the location of the optical element 24 at the non-image plane location 26 and the combination of the layers of the optical element 24 as described above, each sub-image 39 is filtered, has a different subset of field angles, and thus represents different multi-views of the scene 20.

The notch filter array 30 and the polarization-responsive grid array 36 can be arranged in any order around the aperture stop 14. In this embodiment, the microlens elements 38 preferably have the center of the lenses' long axis at the aperture stop 14.

Because the layers of the optical element 24 are fixed to one another, the optical element 24 reduces cross talk between the layers. Each sub-image 39 on the detector array 34 has a physical dimension related to the physical extent of each microlens element 38. The optical element 24 provides simultaneous multi-spectral, polarimetric, imaging data collection at the single pixel/single frame level. Because the optical element 24 is placed at an aperture stop, superpixel layouts can be tailored in shapes and size individually, optimizing which spectral band, which field angles, and which polarizations are given priority.

The sizes of sub-images 39 can be tailored on the detector array 34. For example, a central sub-image 39 could be given priority with a 64×64 pixels image area, while the areas just around it might have a 32×32 pixels image area, and those at the extremes may have a 16×16 pixels image area.

Each relayed and filtered sub-image 39 is a representation of a portion of the scene 20, filtered by the various elements in the optical element 24. Each sub-image 39 may comprise a subset of the total field angles from a sub-aperture of the aperture stop 14. The entire set of field angles subtended by the aperture and objective lens 16 may be contained in the collection of all sub-images 39. A full resolution image can be reconstructed from the set of sub-images 39 where each filtered subset of field angles is spread throughout the fully reconstructed image, and the filtered radiance for all units of each filtered are represented at the pixel level for every detector element on the entire detector array 34.

The optical element 24 may be very thin, such as less than 1 mm thick, or less than 0.5 mm thick. The thinness of the optical element 24, in part, allows the optical element 24 to be placed at the non-image plane location 26, even though the optical element 24 comprises a first layer including the notch filter array 30, a second layer including the microlens array 32, and a third layer including the polarization-responsive grid array 36.

Figure 2:
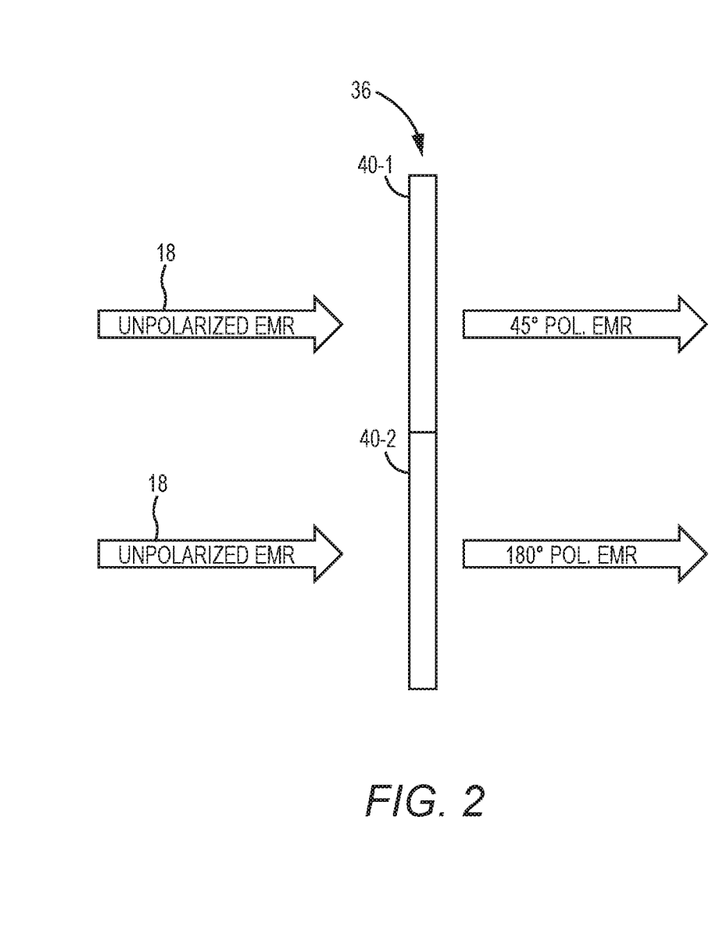
FIG. 2 is a diagram illustrating functionality of a polarization-responsive grid array according to one embodiment.

FIG. 2 is a diagram illustrating functionality of the polarization-responsive grid array 36 according to one embodiment. In particular, two polarization elements 40-1, 40-2 are illustrated. In this example, the polarization-responsive grid array 36 passes EMR 18 based on polarization orientation. For example, the polarization element 40-1 passes only the EMR 18 that has a polarization orientation of 45 degrees, and blocks the EMR 18 that does not have a polarization orientation of 45 degrees. The polarization element 40-2 passes only the EMR 18 that has a polarization orientation of 180 degrees, and blocks the EMR 18 that does not have a polarization orientation 180 degrees.

Figure 3:
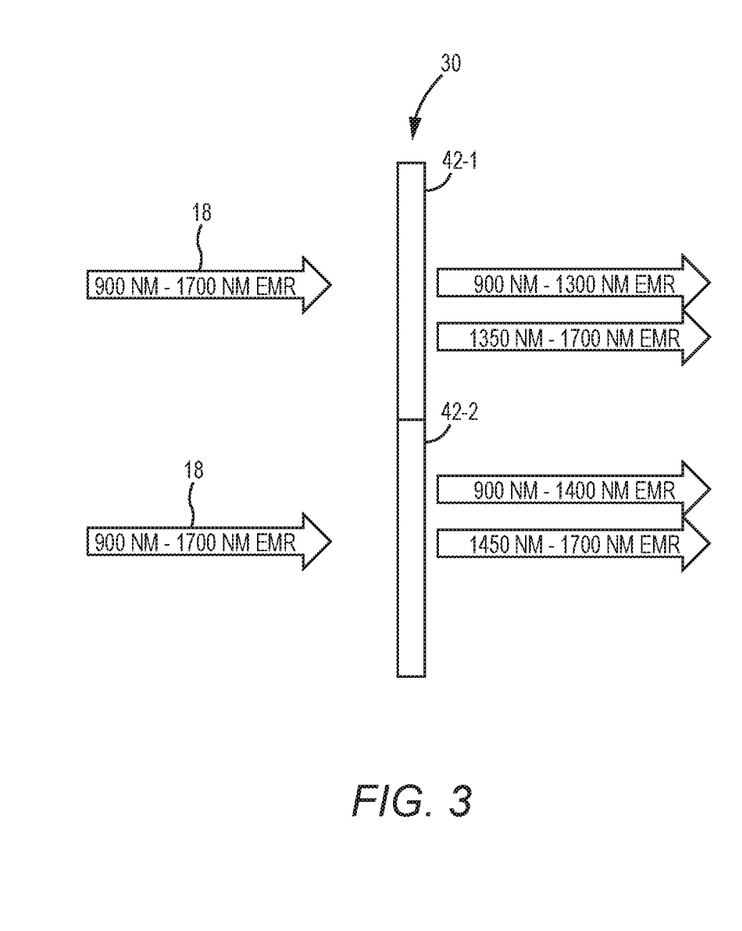
FIG. 3 is a diagram illustrating functionality of a notch filter array according to one embodiment.

FIG. 3 is a diagram illustrating functionality of the notch filter array 30 according to one embodiment. In particular, two notch filter elements 42-1, 42-2 are illustrated. The notch filter element 42-1 blocks EMR 18 in the band of wavelengths between 1301 nanometers (nm) and 1349 nm, and passes EMR 18 outside of those wavelengths. The notch filter element 42-2 blocks EMR 18 in the band of wavelengths between 1401 nanometers (nm) and 1449 nm, and passes EMR 18 outside of those wavelengths.

Figure 4:
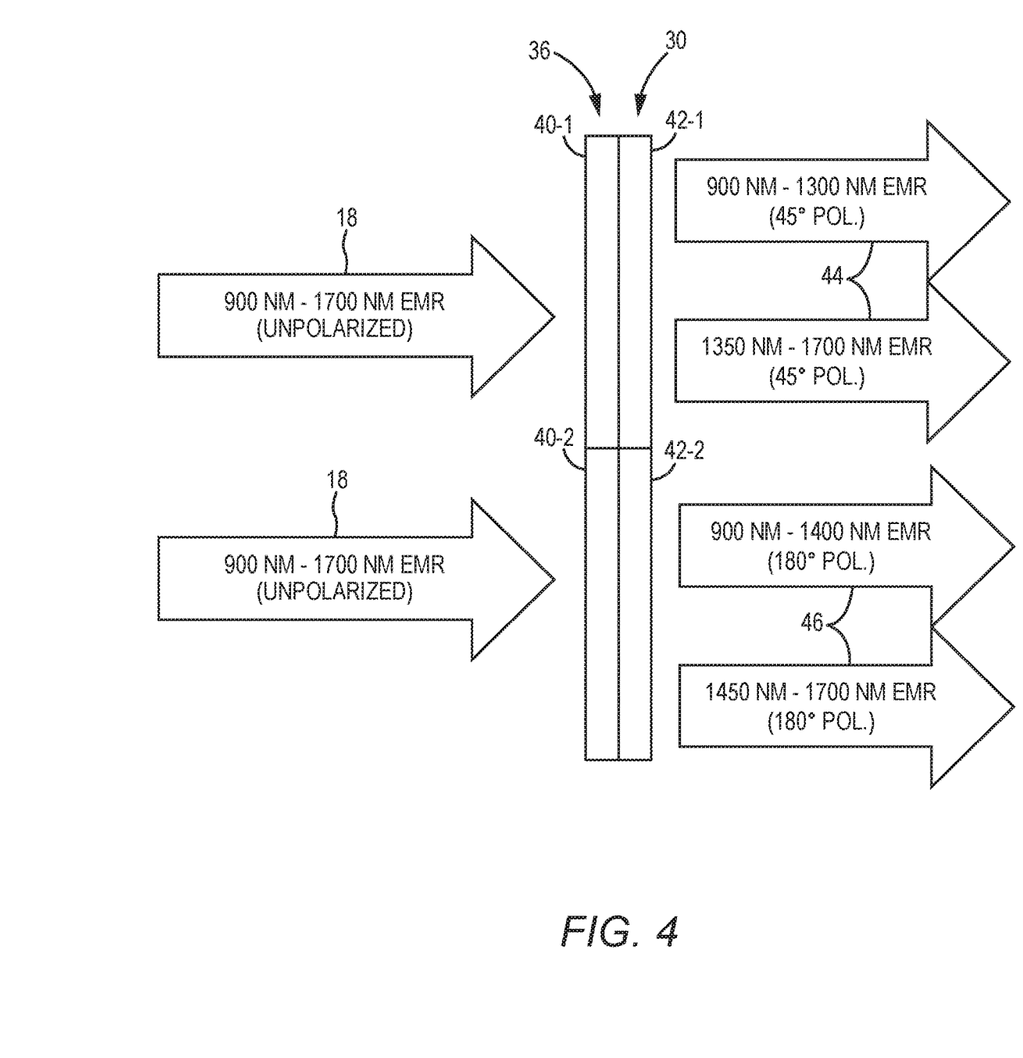
FIG. 4 is a diagram illustrating functionality of the polarization-responsive grid array in conjunction with the notch filter array according to one embodiment.

FIG. 4 is a diagram illustrating functionality of the polarization-responsive grid array 36 in conjunction with the notch filter array 30 according to one embodiment. The polarization element 40-1 receives EMR 18 and passes only the EMR 18 that has a polarization orientation of 45 degrees, and blocks the EMR 18 that does not have the polarization orientation of 45 degrees. The notch filter element 42-1 receives the EMR 18 that has the polarization orientation of 45 degrees from the polarization element 40-1, blocks the band of wavelengths between 1301 nanometers (nm) and 1349 nm, and passes EMR 18 outside of those wavelengths. In combination, the polarization element 40-1 and the notch filter element 42-1 pass a subset 44 of the EMR 18 that has wavelengths between 900 nm-1300 nm and between 1350 nm-1700 nm, and a polarization orientation of 45 degrees. A microlens element (not illustrated) then relays this sub-image to a particular set of detector elements on the detector array 34.

The polarization element 40-2 receives EMR 18 and passes only the EMR 18 that has a polarization orientation of 180 degrees, and blocks the EMR 18 that does not have the polarization orientation of 180 degrees. The notch filter element 42-2 receives the EMR 18 that has the polarization orientation of 180 degrees from the polarization element 40-2, blocks the band of wavelengths between 1401 nanometers (nm) and 1449 nm, and passes EMR 18 outside of those wavelengths. In combination, the polarization element 40-2 and the notch filter element 42-2 pass a subset 46 of the EMR 18 that has wavelengths between 900 nm-1400 nm and between 1450 nm-1700 nm, and a polarization orientation of 180 degrees. A microlens element (not illustrated) then relays this sub-image to a particular set of detector elements on the detector array 34.

Figure 5:
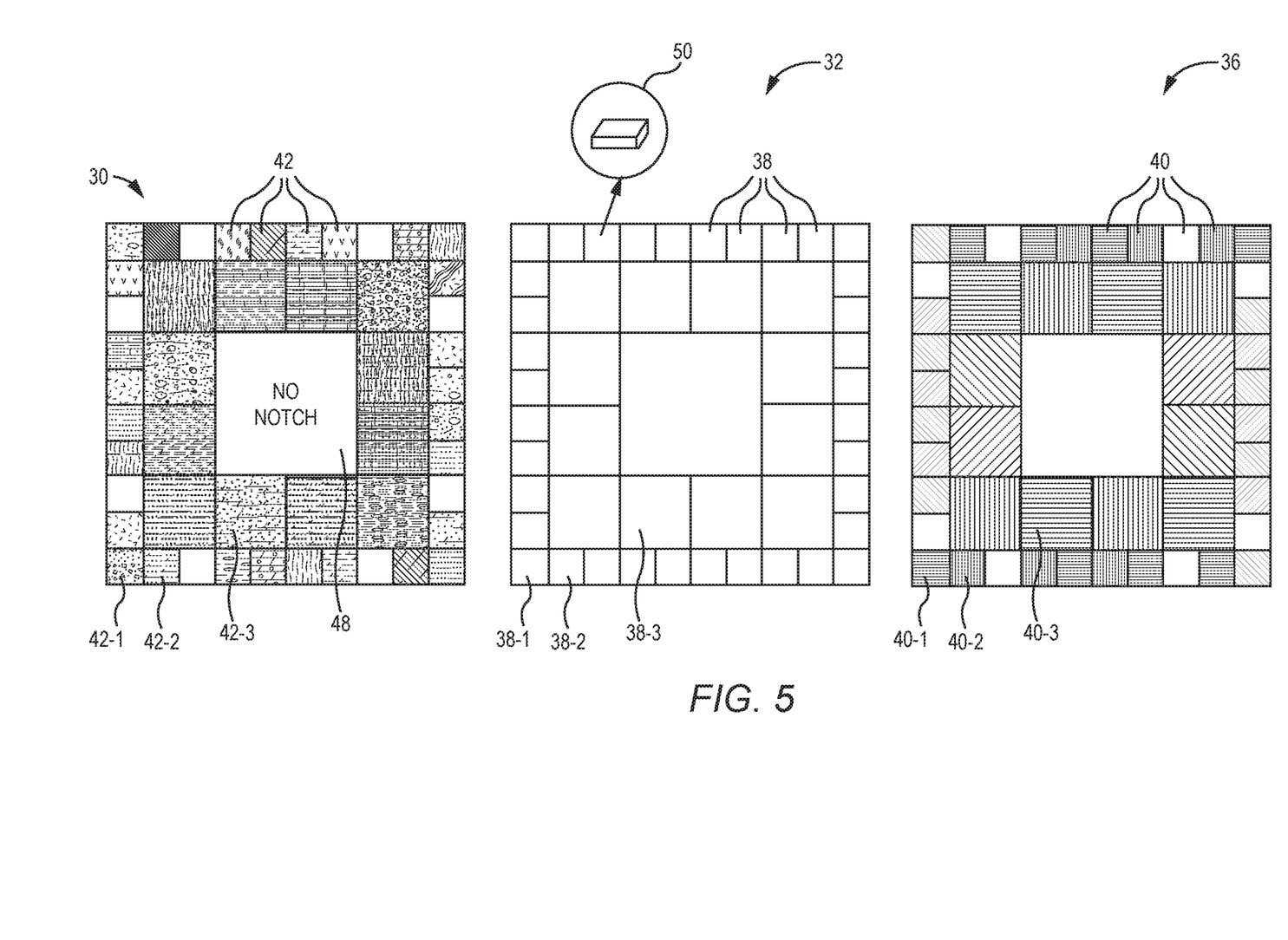
FIG. 5 is a diagram illustrating three layers of the optical element illustrated in FIG. 1 according to one embodiment.

FIG. 5 is a diagram illustrating the three layers of the optical element 24 according to one embodiment. The notch filter array 30 is a first layer that comprises a plurality of notch filter elements 42, 42-1-42-3. For purposes of illustration, some notch filter elements are not separately labelled. The notch filter elements 42 may have different sizes, as illustrated by the notch filter elements 42-2 and 42-3. In this embodiment, the notch filter array 30 includes a non-filtered portion 48 that allows all EMR to pass.

Each notch filter element 42, 42-1-42-3 may block a different notch (i.e., relatively narrow band) of wavelengths. Some of the notch filter elements 42, 42-1-42-3 may block a same band of wavelengths. The use of notched bands instead of a conventional bandpass or dispersion element achieves a 10 fold increase in energy throughput and 3 fold increase in spatial resolution advantage compared with the use of bandpass filters.

The use of traditional dispersion optics or bandpass filters significantly lowers performance across the entire broadband range, only passing a small fraction of the total in-band energy to a single detector element. This significantly reduces throughput (sensitivity) and/or spectral-spatial resolution. In contrast, narrow notched band filters remove a very narrow band of spectral energy. The notch filter array 30 may be implemented, for example, via a writable chalcogenide multilayer stack, where specific optical characteristics are prescribed by spatially controlling the volume fill fraction of crystals in each layer.

In some embodiments, the notch filter array 30 may be manufactured in accordance with the mechanisms disclosed in U.S. Pat. No. 9,340,446, the contents of which are hereby incorporated by reference herein. A notched filter array 30 useful for infrared wavelengths (1.0-14 microns) may be constructed by thin film layering materials such as Ge, As, Se, Pb, S in a mixture, or for visible-near-infrared wavelengths (300-1000 nm) by using gradient index glasses, using three-dimensional (3D) printing of glass or plastic materials, and by using polymer-based materials (i.e. those manufactured by PolymerPlus LLC) that are formed in thin laminate layers with varying thicknesses and refractive indices to design notch bands that are reflected away from the optic along the propagation axis. For all wavelengths, using a variety of materials that can be altered using a laser, another approach can use volumetric holographic with gratings written to notch (disperse) specific narrow bands.

In the former, the layers of notch filter elements 42 may extend between 100 nm-50 um in thickness each. The entire series of layers would have broadband transmission across the infrared. By using a laser (i.e., $CO_2$) to heat, a given element layer can be heated until the refractive index change occurs that creates an absorption band in a narrow band of the broad transmission. This absorption band creates a narrow spectral notch. The entire notch filter array 30 would have notches covering the entire bandwidth desired, spread through the notch filter elements 42 of the notch filter array 30 that filter each sub-image 39 on the detector array 34.

In one embodiment, the steps for generalized notched filter image reconstruction are:
1) The detected radiance on the detector array 34 is modeled as an integral of the scene radiance through the optical/detection system function.
   a. This process utilizes a forward model of the optical device 12 based on the particular design.
2) Perform an estimate of the spatial-spectral scene which best matches the measured data of the detector array 34 when it is processed through the forward model of the optical device, such as a least squares fit, weighted by the statistical spatial-spectral covariance obtained from similar scenes 20 in previous data (also called training data).
   a. This process utilizes a reverse model of the radiance on the detector array 34 to be solved for, in order to extract the multimodal image content.

Note that the data does not have to be reconstructed to be useful. The utility depends on the particular optical design and the amount of overlap in each sub-image 39 that the microlens elements 38 create on the detector array 34. The data may be used for relatively more simple data filtering of the scene radiance as filtered by the notch spectral responses. However, once spectral imagery is reconstructed, the data may be used more powerfully for target detection, classification, and even identification analysis.

The microlens array 32 is a second layer of the optical element 24 and comprises a plurality of microlens elements 38, 38-1-38-3. For purposes of illustration, some microlens elements are not separately labelled. Note that the microlens elements 38 may match the size of the notch filter elements 42 that are coupled to the microlens elements 38. Thus, in this embodiment, each of the notch filter elements 42 has a same size as the microlens element 38 that is immediately adjacent to the notch filter element 42 in the direction of the propagation of the EMR 18. The microlens array 32 is a planar array and may be between 10-500 microns thick, with a unit lens having a diameter between 20-300 microns. In one embodiment, the microlens array 32 may be constructed in accordance with the teachings disclosed in U.S. Pat. No. 9,340,446. A microlens array 32 suitable for operation in the visible-near-infrared (400-1000 nm) wavelengths can be constructed by 3D printing using glass and plastic materials into sub-micron lens features.

The microlens elements 38 may be planar and square, as illustrated by inset 50. The microlens elements 38 may have six faces, wherein the angle between any two adjacent faces is a right angle, such that the microlens elements 38 have a cuboid shape. In some embodiments planar and square microlens elements 38 may be patterned on silicon and germanium using e-beam lithography. Other designs and methods can be used, such as diffractive Fresnel lenses and volume holographic written lenses. The square shape of the microlens elements 38 decreases cross-talk by the compact square lattice arrangement of the array of the microlens elements 38. Visible and near infrared (300-1000 nm) microlens elements 38 may use materials such as silica glass with gradient indices via etching with e-beam lithography, and use polymer-based materials, (i.e. those manufactured by PolymerPlus LLC, for example) that are formed in thin laminate layers and then pressed into lens arrays by stamping the shape and curvature.

The square shape of the microlens elements 38 allows integration of other layers, such as the notch filter array 30 and the polarization-responsive grid array 36 that may not conform well to the curved surfaces provided by conventional lenses. Due to the fast optics and reduced crosstalk, the planar microlens elements 38 maintain much higher spatial resolution than traditional circular microlenses. The microlens array 32 can be written in the bulk of a gradient index (GRIN) material in accordance with mechanisms disclosed in U.S. Pat. No. 9,340,446. The focusing property of the microlens elements 38 is achieved by the refractive index change in the flat GRIN layer, rather than by the curvature of the microlens array 32.

In particular, a desired refractive index ($n_{eff}$) of a microlens element 38 can be implemented across a surface of the microlens element 38 in accordance with the following formula to obtain a desired focusing property:

$$n_{eff} = n_{substrate} + \frac{\pi D^2}{2\sqrt{3} \cdot L^2}(n_{air} - n_{substrate})$$

wherein $n_{substrate}$ is the refractive index of the substrate; D is a diameter of an opening; and L is a pitch that identifies a distance between the center of two openings. The values of the variables D and L can be varied at each location on the surface of the microlens element 38 to determine $n_{eff}$ at each location to derive the appropriate focusing property of the microlens element 38. The openings can be formed, for example, by an energy beam, such as an ion beam or a laser beam, or the openings can be formed via etching.

The polarization-responsive grid array 36 is a third layer of the optical element 24, and comprises a plurality of polarization elements 40, 40-1-40-3. For purposes of illustration, some polarization elements are not separately labelled. Note that the polarization elements 40, 40-1-40-3 may match the size of the notch filter elements 42 and the microlens elements 38 that are immediately upstream of the polarization elements 40, 40-1-40-3 coupled to the microlens elements 38. Thus, in this embodiment, each of the polarization elements 40, 40-1-40-3 has a same size as the microlens element 38 that is immediately adjacent to and upstream of the polarization elements 40, 40-1-40-3.

Because each polarization element 40 is positioned at an aperture stop, or pupil plane, the polarization elements 40 may filter field angles rather than image positions. Highest scene polarizations tend to reside at steepest field angles, and lowest polarization at the central angles, suggesting Stokes S1 (90°-0°) resides in the upper and lower field angles and Stokes S2 (135°-45°) resides at the left and right sides/corners of the filter. This optimizes superpixel patterning to leave unfiltered regions (polarization, Stokes S0) to improve transmission.

In some embodiments the polarization-responsive grid array 36 may be constructed using nanostructured multicomponent chalcogenides to functionalize polarization and birefringence in the infrared bands.

While for purposes of illustration the notch filter elements 42, the microlens elements 38, and the polarization elements 40 are all rectangular, the embodiments are not limited to rectangular-shaped elements, and may be any other shape, or combinations of shapes, such as triangular, circular, elliptical, or the like.

As illustrated in FIG. 5, in some embodiments the notch filter array 30, the microlens array 32, and the polarization-responsive grid array 36 may have a same element pattern, such that three elements act upon the same energy. For example, the notch filter element 42-1, the microlens element 38-1, and the polarization element 40-1 have a correspondence with one another in that they are adjacent to one another in the direction of propagation of the EMR 18, and any energy that ultimately passes through the polarization elements 40-1 also passed through the microlens element 38-1 and the notch filter element 42-1.

In one embodiment, the microlens array 32 can be written in the bulk of a GRIN material. The focusing property of the microlens elements 38 will be achieved by the refractive index change in the flat GRIN layer rather than by the curvature of the lens. The notch filter array 30 will then be deposited on one side of the microlens array 32. The notch filter array 30 can be fabricated using a multi-layer dielectric stack of coating material deposited on the GRIN substrate. The polarization-responsive grid array 36 is then deposited on the opposite side of the microlens array 32. In one embodiment, the polarization-responsive grid array 36 can be patterned using an array of metallic grid lines with different orientations.

Those skilled in the art will recognize improvements and modifications to the preferred embodiments of the disclosure. All such improvements and modifications are considered within the scope of the concepts disclosed herein and the claims that follow.

What is claimed is:

1. An optical element comprising a plurality of layers, the plurality of layers comprising:
    a notch filter array comprising a plurality of notch filter elements, each notch filter element configured to filter out energy within at least one wavelength band of interest;
    a polarization-responsive grid array comprising a plurality of polarization elements; and
    a microlens array comprising a plurality of microlens elements, wherein each microlens element is configured to image a portion of a scene onto an image plane;
    wherein each layer of the optical element is in contact with an adjacent layer, and each microlens element is configured to image the portion of the scene onto the image plane by relaying a portion of an image from an intermediate image plane that is upstream from the microlens element onto the image plane.

2. The optical element of claim 1 wherein the optical element is configured to be positioned at an aperture stop or a pupil plane of an optical system.

3. The optical element of claim 1 wherein the optical element is less than or equal to 1 mm in thickness.

4. The optical element of claim 1 wherein the optical element is less than or equal to 0.5 mm in thickness.

5. The optical element of claim 1 wherein the plurality of layers further comprises a phase microgrid array comprising a plurality of phase filters that modify the phase of the energy.

6. The optical element of claim 1 wherein the plurality of layers further comprises an intensity micromask array comprising a plurality of intensity filters that modify the intensity of the energy.

7. The optical element of claim 1 wherein each microlens element of the plurality of microlens elements has six faces, the angle between any two adjacent faces being a right angle.

8. The optical element of claim 1 wherein each microlens element of the plurality of microlens elements has a cuboid shape.

9. The optical element of claim 1 wherein the microlens array is planar.

10. The optical element of claim 1 wherein each notch filter element corresponds to a corresponding polarization element and to a corresponding microlens element, such that energy passing through the notch filter element passes through the corresponding polarization element and the corresponding microlens element.

11. The optical element of claim 10 wherein each notch filter element has a same shape, height, and width as the corresponding polarization element and the corresponding microlens element.

12. The optical element of claim 10 wherein the plurality of notch filter elements comprises notch filter elements of different shapes.

13. The optical element of claim 10 wherein the plurality of notch filter elements comprises notch filter elements of different sizes.

14. The optical element of claim 1 wherein the microlens array further comprises a gradient-index microlens array.

15. The optical element of claim 1 wherein each polarization element passes energy having a particular polarization angle or handedness, and wherein the plurality of polarization elements collectively pass energy having between two and six polarization angles or handednesses.

16. The optical element of claim 1 wherein each polarization element is configured to displace an S and P polarization of energy, from ordinary and extraordinary axes, at different angles or rotations of displacement.

17. An optical system comprising:
    an objective lens system configured to receive energy from a scene and focus the energy on an intermediate image plane;
    a detector array; and
    an optical element positioned at a non-image plane downstream of the intermediate image plane and upstream of the detector array, the optical element comprising a plurality of layers, the plurality of layers including:
    a notch filter array comprising a plurality of notch filter elements, each notch filter element configured to filter out energy within at least one wavelength band of interest;
    a polarization-responsive grid array comprising a plurality of polarization elements; and
    a microlens array comprising a plurality of microlens elements, wherein each microlens element is configured to image a portion of a scene onto an image plane, and each microlens element is configured to image the portion of the scene onto the image plane by relaying a portion of an image from the intermediate image plane that is upstream from the microlens element onto the image plane.

18. An optical element comprising a plurality of layers, the plurality of layers comprising:
    a notch filter array comprising a plurality of notch filter elements, each notch filter element configured to filter out energy within at least one wavelength band of interest;
    a polarization-responsive grid array comprising a plurality of polarization elements; and
    a microlens array comprising a plurality of microlens elements, wherein each microlens element is configured to image a portion of a scene onto an image plane;
    wherein the optical element is configured to be positioned at a pupil plane of an optical system.

* * * * *